United States Patent [19]

Takada et al.

[11] Patent Number: 4,775,347
[45] Date of Patent: Oct. 4, 1988

[54] METHOD OF INSTALLING A WINDOW MEMBER OF AN INFRARED DETECTOR

[75] Inventors: Syuji Takada; Koichi Matsumoto; Takasi Gyobu; Kazuo Nakajiwa, all of Minami, Japan

[73] Assignee: Horiba, Ltd., Kyoto, Japan

[21] Appl. No.: 25,808

[22] Filed: Mar. 13, 1987

[30] Foreign Application Priority Data

Aug. 18, 1986 [JP] Japan .................. 61-192409

[51] Int. Cl.$^4$ .................................................. G01J 5/04
[52] U.S. Cl. ...................................... 445/44; 228/124; 228/198; 228/175; 156/108
[58] Field of Search .................. 445/45, 44; 228/124, 228/118, 198, 175; 156/108

[56] References Cited

U.S. PATENT DOCUMENTS

| | | | |
|---|---|---|---|
| 2,075,477 | 3/1937 | Smith | 228/198 X |
| 3,153,839 | 10/1964 | Pakswer et al. | 445/44 X |
| 4,420,869 | 12/1983 | Erkan et al. | 445/44 X |

Primary Examiner—Kenneth J. Ramsey
Attorney, Agent, or Firm—Wenderoth, Lind & Ponack

[57] ABSTRACT

A method for fixing a window member having a layer of electrically conductive material to a can of an infrared detector over an incident opening extending through a surface of the can is performed by adhering the window member to the can with a non-conductive adhesive applied between an end surface and a side circumferential surface of the window member and a surface of the casing while leaving a portion of the side circumferential surface, formed by the electrically conductive material layer, partially exposed, masking an opposing end surface of the window member and then covering the result with a thin film of electrically conductive material part of which extends between the exposed side circumferential surface of the electrically conductive material layer of the window member and the surface of the can. Finally, the mask and the portion of the thin film of electrically conductive material covering the mask are removed.

4 Claims, 6 Drawing Sheets

METHOD OF INSTALLING A WINDOW MEMBER OF AN INFRARED DETECTOR

BACKGROUND OF THE INVENTION

1. Field of the Invention

The present invention relates to a method of installing a window member in an infrared detector, for example a method of installing an interference filter in a pyroelectric detector, and in particular to a method of installing a window member provided with at least an electrically conductive material layer over an infrared incident opening extending through a can. The can is provided with a sensing element therein and the infrared incident opening and is formed of an electrically conductive material. The present invention also relates to the manufacture of an infrared detector provided with said window member mounted thereon.

2. Description of the Prior Art

In the prior infrared detector a can, provided with a sensing element therein and an infrared incident opening, is formed of an electrically conductive material (metal) but a window member such as an interference filter (transmitting an infrared light within the specific wave length range only) or a lens fixedly mounted over the infrared incident opening of the can are usually formed of an electrically nonconductive (insulating) material such as glass, so that problems have occurred in that shielding of such an electrically nonconductive window member can not be achieved and noise due to a disturbance such as an electromagnetic wave is generated.

So, for example in the case where an interference filter is used as the window member, as shown in FIG. 7, the window member has been made electrically conductive by forming interference filter layers b, b (usually formed in multi-layers by vacuum evaporation with electrically nonconductive materials) on the surface of a substrate layer "a" formed of a silicon (Si) smmiconductor, a germanium (Ge) semiconductor or the like. In the installment of the window member over the infrared incident opening of the can, as shown in for example FIG. 8, almost the entire circumferential edge surface of the window member c is adhered to the circumferential surface around the infrared incident opening e by means of electrically conductive adhesives f such as silver (Ag) paste to electrically and integrally connect the window member c with the can d, thereby forming a shield for the window member c, the can d and the connection therebetween, in short the whole infrared detector. However, in this case, since the adherence is carried out by means of only the electrically conductive adhesive f, there has been problems related to the strength of the adhered portions and to the durability.

Under these circumstances, in order to secure a shield so as to have sufficient strength and durability, the following method of installing a window member in an infrared detector has been practically used recently.

As shown at first in FIG. 9(A), the window member c adapted to have at least the electrically conductive material layer "a", as above described, is firmly adhered to the circumferential surface around the infrared incident opening e of the can d by means of epoxy resin and phenol resin electrically nonconductive adhesives g, which are said to have high adhesive strength, and to be waterproof and corrosion resistant, extending between the circumferential surface around the infrared incident opening e of the can d to a portion of the circumferential edge surface of the window member c so that at least the upper half of the circumferential edge surface of the electrically conductive material layer "a" is exposed. Then, as shown in FIG. 9(B), the electrically conductive adhesives f are applied so that said exposed upper half of the circumferential edge surface of the window member c is connected with an exposed end surface of the can d arranged therearound.

However, with the conventional method as shown in FIGS. 9(A), 9(B), since the adhesive applying process and drying process for drying the applied adhesives are performed twice each, productivity in the manufacturing of the detectors is low. Furthermore, in the process of applying electrically conductive adhesives f as shown in FIG. 9(B), fluctuation of the painting area and painted condition due to the manual operation is liable to occur, thereby leading to an incomplete shield and low yield of the products.

SUMMARY OF THE INVENTION

The present invention was achieved in view of such an actual method and it is an object of the present invention to provide a method of installing a window member in an infrared detector in which the window member can be securely shielded and firmly mounted by an easy, efficient and high reliable and productive operating process.

In order to achieve the above-described object, according to the present invention, in the manufacture of an infrared detector A in which a window member 2, which may be square, provided with at least an electrically conductive layer 2a is adhered over an infrared incident opening 1a of a can 1 provided with a sensing element (not shown) therein and said infrared incident opening 1a extending therethrough and formed of electrically conductive materials, at first, said window member 2 is adhered to the circumferential surface around the infrared incident opening 1a of the can 1 by means of electrically nonconductive adhesives 3 extending between the outside circumferential surface around the infrared incident opening 1a of the can 1 to a portion of the circumferential edge surface of the window member 2 so that at least a part of the circumferential edge surface of said electrically conductive material layer 2a is exposed. A mask 4 is then applied to the outer end surface of the window member 2. Then, an electrically conductive thin film is formed continuously over substantially the entire surface of the mask 4 and the outside end surface of the can 1 surrounding the surface of the mask 4. Subsequently, said mask 4 is stripped with the electrically conductive thin film formed on the surface thereof from the outer end surface of the window member.

According to a method of the present invention, a window member having at least an electrically conductive material layer is firmly adhered to the circumferential surface around an infrared incident opening of a can by means of electrically nonconductive adhesives extending between a circumferential portion of the inner end surface of the window member, a portion of a circumferential edge surface of the window member and a circumferential surface around the incident opening 1a of the can 1. Then, the outer end surface of said window member is covered with the mask. Subsequently, an electrically conductive thin film is continuously formed on substantially the entire surface of the mask and the outside end surface of said can surrounding said surface of the mask (by known methods such as spattering, vacuum vapor coating and the CVD method). Finally, said mask is stripped with the electrically conductive thin film formed on the surface thereof from the outer end surface of the window member. Thus, electrically conductive substances can be put between the remaining exposed portion of the circumferential edge surface of the window member and an exposed surface of the can very easily, efficiently, reliably and uniformly in comparison with the conventional manual applying operation. Accordingly, the window member can be securely shielded and firmly mounted by the easy, efficient and highly reliable and productive operating process.

DESCRIPTION OF THE PREFERRED EMBODIMENTS

A method of installing an interference filter as a window member in a pyroelectric detector, which is one example of an infrared detector, is described as a preferred embodiment of a method according to the present invention with reference to the drawings (FIGS. 2-6).

FIGS. 2(A)-(E) and 3(A)-(E), show the first preferred embodiment.

Figure 1:
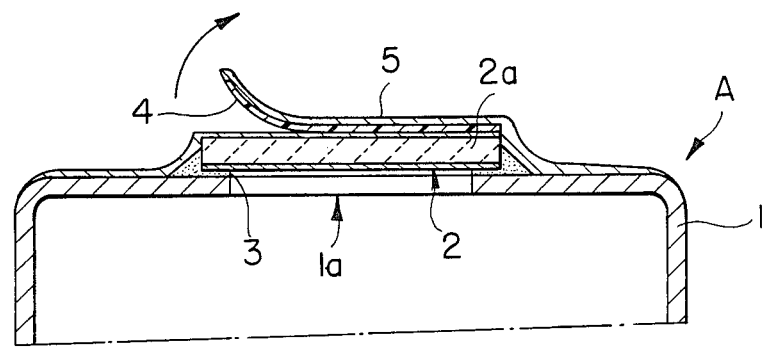
FIG. 1 is a longitudinal section view showing principal parts and illustrating the fundamental procedure of a method of installing a window member in an infrared detector according to the first embodiment the present invention.
Figure 2A:
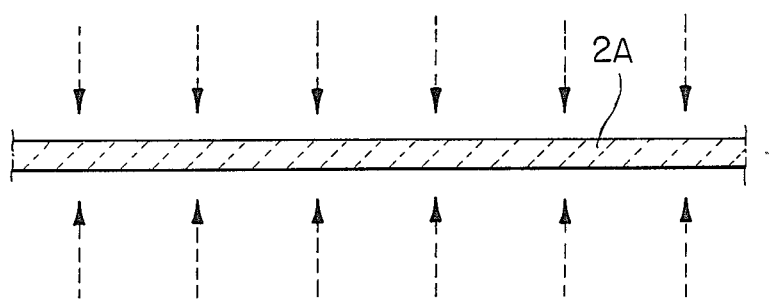
FIGS. 2(A)-(E) are longitudinal sectional views illustrating initial steps in the process of the first preferred embodiment.
Figure 2B:
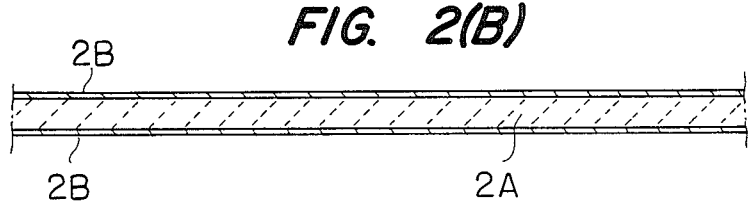
Figure 2C:
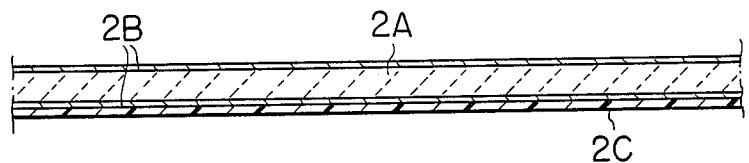
Figure 2D:
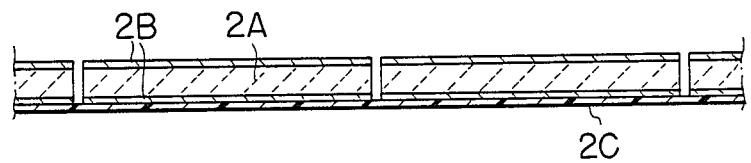
Figure 2E:
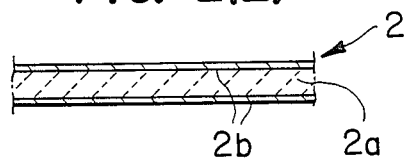

FIGS. 2(A) and 2(B) show the method of manufacturing a window member 2 in the form of an interference filter, which is an initial step for carrying out a method according to the present invention. At first, as shown in FIG. 2(A), electrically nonconductive interference filter layers 2B, 2B as shown in FIG. 2(B) are formed on both sides of an electrically conductive substrate layer 2A composed of, for example, a silicon (Si) semiconductor wafer, a germanium (Ge) semiconductor wafer or the like, by vacuum evaporation or the like. Then as shown in FIG. 2(C), a dieing adhesive tape 2C is stuck on one side of said electrically nonconductive interference filter layers 2B. Subsequently, as shown in FIG. 2(D), a large number of window members 2, as shown in FIG. 2(E), provided with electrically nonconductive interference filter layers 2b, 2b on both sides of the electrically conductive material layer 2a composed of a semiconductor, are manufactured by dividing said electrically conductive substrate layer 2A and said electrically nonconductive interference filter layers 2B, 2B into parts by dieing and then separating said dieing tape 2C.

An interference filter used as a window member 2 manufactured so as to have at least the electrically conductive material layer 2a in the above described manner is provided on a can forming the outside casing of the detector. A sensing element body is included in the can and the filter is mounted over an infrared incident opening of the can by the procedure as shown n FIGS. 3(A)-(E), the can being formed of electrically conductive materials.

Figure 3A:
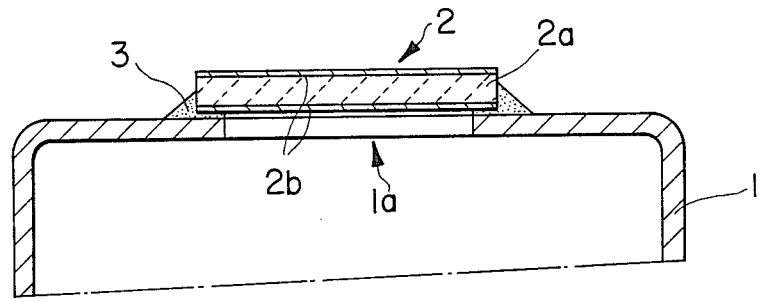
FIGS. 3(A)-(E) are longitudinal sectional views illustrating subsequent steps in the process of the first preferred embodiment.

(i) At first, as shown in FIG. 3(A), the window member is adhered to the circumferential surface around the infrared incident opening 1a of the can 1 at a circumferential portion of the inner end surface and a portion of the circumferential side surface of the window so as to expose at least a part (almost an upper half in this embodiment) of the circumferential side surface of the electrically conductive material layer 2a all along the circumferential side surface by the operation (carried out automatically by machinery) by, for example, applying a suitable quality of electrically nonconductive adhesives 3 to the circumferential surface around the infrared incident opening 1a of the can 1. Then said window member 2 is placed on the electrically nonconductive adhesives 3, followed by drying.

Figure 3B:
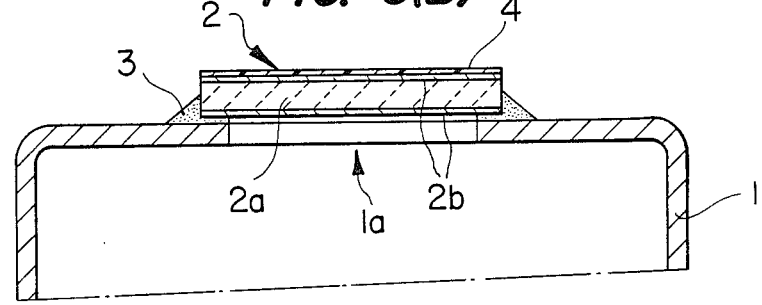

(ii) Then, as shown in FIG. 3(B), a mask 4 such as an adhesive tape is stuck to the surface of the non-adhered end surface (the outermost end surface in this preferred embodiment) of the window member 2.

Figure 3C:
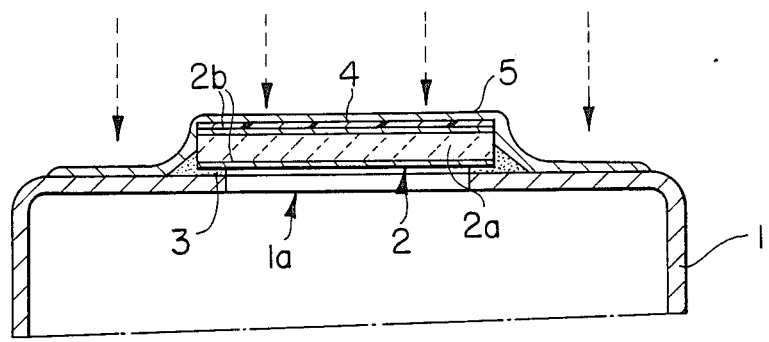

(iii) Subsequently, as shown in FIG. 3(C), an electrically conductive thin film 5 formed of a metal selected from a group consisting of gold (Au), copper (Cu), nickel (Ni), nickel-chromium alloy (Ni-Cr) and chomium (Cr) is continuously formed substantially over the entire surface of the mask 4 and the surface (the outside end surface of this embodiment) of the can 1 surrounding said surface of the mask 4 by spattering which is one thin film-forming method that may be employed (although chemical vapor deposition called CVD, vacuum vapor coating or the like can be used for the thin film-forming method instead of spattering, but spattering has advantages in that the metal can be very satisfactorily applied to the exposed portion of the circumferential side surface of the window member 2, the adhesion strength is high, and the temperature rises little in the formation of the thin film).

Figure 3D:
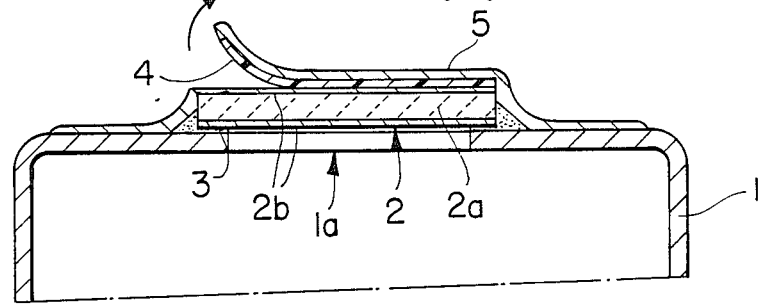
Figure 3E:
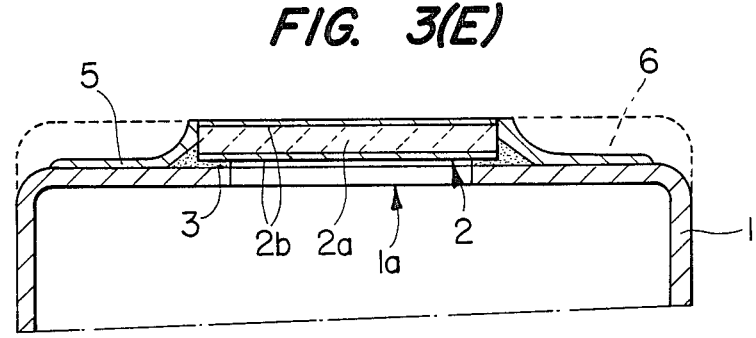

(iv) Finally, as shown in FIG. 3(D), the mask 4 is removed with the electrically conductive thin film 5 formed thereon, whereby, as shown in FIG. 3(E), the previously exposed portion of the circumferential side surface of the electrically conductive material layer 2a of the window member 2 is connected with the outside and surface of the electrically conductive can 1 surrounding said circumferential side surface by means of the electrically conductive thin film 5 under an almost uniform condition over the entire circumference thereby forming a superiorly secured shield. Thus, the window member 2 can be firmly mounted over the infrared incident opening 1a of the can 1 by the electrically nonconductive adhesives 3. In addition, although it is not essential, the portions of the outside end surface of the can 1 surrounding the window member 2 may be coated with a synthetic resin layer 6 or the like.

Figure 4:
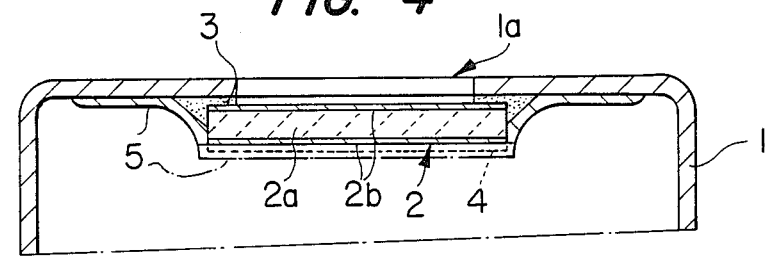
FIG. 4 is a longitudinal sectional view for illustrating a modification of the structure obtained by performing steps according to the first preferred embodiment.

Although a window member 2 (an interference filter) installed on the outside end surface of said can 1 was described in said first preferred embodiment, it goes without saying that a window member 2 can be installed within the can 1, as shown in FIG. 4. The procedure in this case is be easily inferred by analogy with the description of FIGS. 3(A)–(E) and will thus, be ommitted.

FIGS. 5(A)–(E) and 6(A)–(D) show the second preferred embodiment.

The greatest characteristic of this second preferred embodiment is that contrary to said first preferred embodiment wherein the window member 2 is adhered to the circumferential surface around the light incident opening 1a of the can 1 and then the non-adhered end surface of the window member 2 is covered with the mask 4, one end surface of the non-adhered end of the window member 2 is covered with the mask 4 prior to the adherence of the window member 2 to the circumferential surface around the infrared incident opening 1a of the can 1.

Figure 5A:
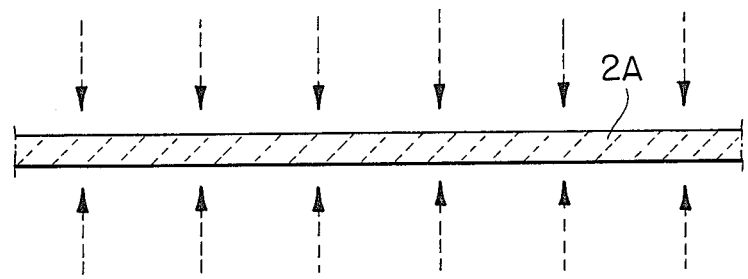
FIGS. 5(A)-(E) are longitudinal sectional views illustrating initial steps in the process of a second preferred embodiment.
Figure 5B:
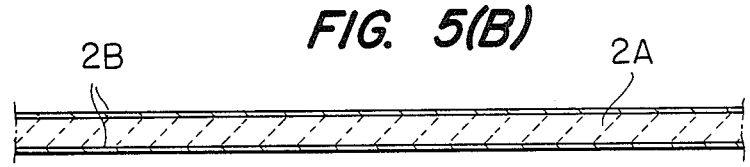

FIGS. 5(A)–5(E) illustrate steps in the manufacturing of the window member 2 (interference filter) which comprise an initial process for carrying out a method of installation according to this second preferred embodiment. Since the steps shown in FIGS. 5(A), 5(B) are quite the same as those shown in FIGS. 2(A), 2(B) of said first preferred embodiment, the description of them will be omitted.

Figure 5C:
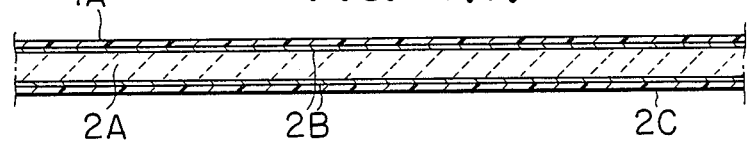
Figure 5D:
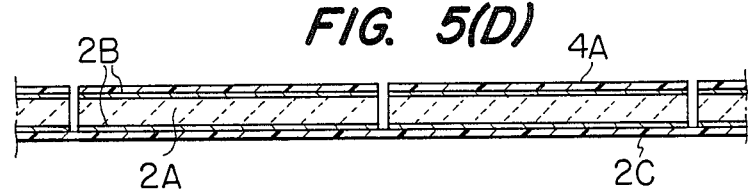
Figure 5E:
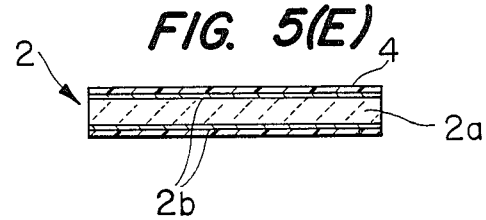

Thus, a large number of the window members 2 formed as interference filters as shown in FIG. 5(A), provided with the electrically nonconductive interference filter layers 2b, 2b on both sides thereof and the mask 4 previously stuck to one side surface thereof, are manufactured by forming the electrically nonconductive interference filter layers 2B, 2B on both sides of the electrically conductive substrate layers 2A, as shown in FIG. 5(B), sticking the dieing adhesive tape 2C on one end surface of the electrically nonconductive interference filter layers 2B, 2B while the masking adhesive tape 4A, which becomes the mask 4 later, is stuck to the other end surface of the electrically nonconductive interference filter layers 2B, 2B, as shown in FIG. 5(C), cutting said mask adhesive tape 4A, said electrically conductive substrate layer 2A and said electrically nonconductive interference filter layers 2B, 2B into parts by dieing leaving only said dying tape 2C uncut as shown in FIG. 5(D), and then separating said dieing tape 2C.

The interference filter, which is provided with at least the electrically conductive material layer 2a and the mask member 4 previously stuck on one end surface thereof, manufactured in the above described manner, is mounted on the infrared incident opening of the can 1 by the procedure as shown in FIGS. 6(A)–(D).

Figure 6A:
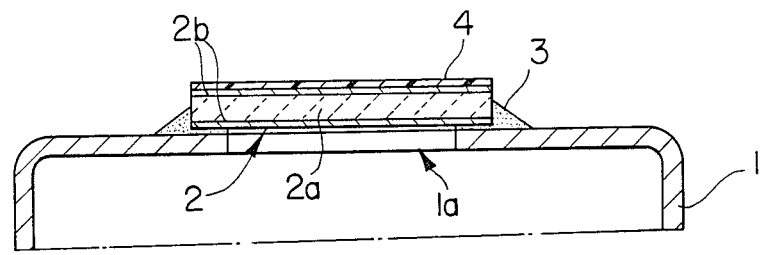
FIGS. 6(A)-(D) are longitudinal sectional views illustrating subsequent steps in the process of the second preferred embodiment.

(i) At first, as shown in FIG. 6(A), the window member 2 is firmly adhered to the circumferential surface around the infrared incident opening 1a of the can 1 by means of the electrically non-conductive adhesives 3 in the same manner as in the case shown in FIG. 3(A).

Figure 6B:
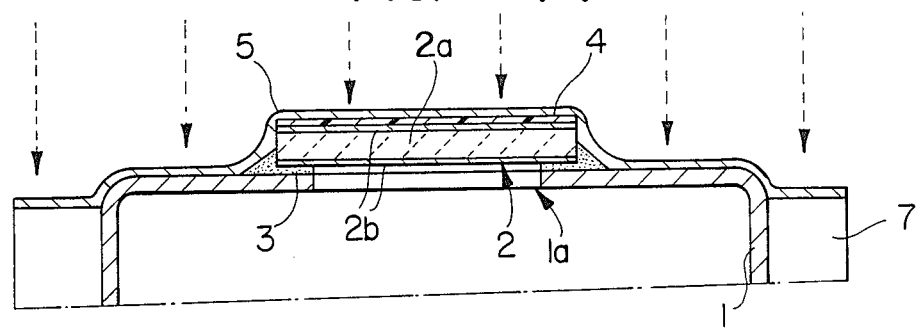

(ii) Subsequently, as shown in FIG. 6(B), in order to give a beautiful finish to the can 1, the electrically conductive thin film 5 is continuously formed over the entire surface of said mask 4, and the outer end surface of the can 1 surrounding said surface of said mask, and the outer end surface of a masking jig 7 in the same manner as in the case shown in FIG. 3(C).

Figure 6C:
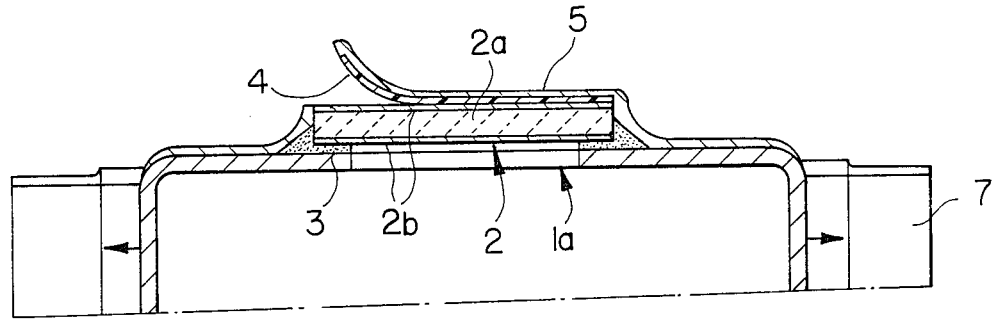
Figure 6D:
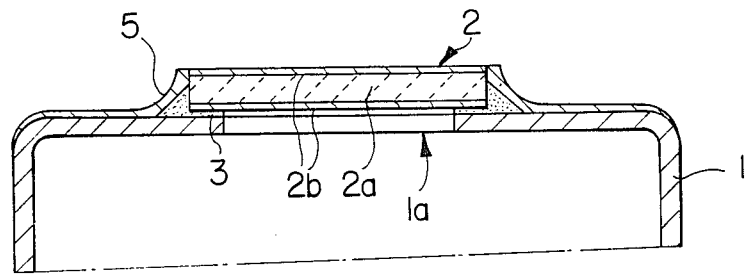
Figure 7:
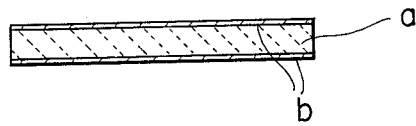
FIG. 7 is a longitudinal sectional view showing one example of a prior art window member.
Figure 8:
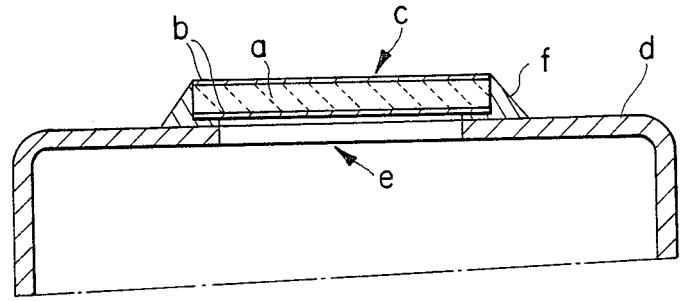
FIG. 8 is a longitudinal sectional view illustrating a structure obtained by performing the steps according to the procedure of the prior art.
Figure 9A:
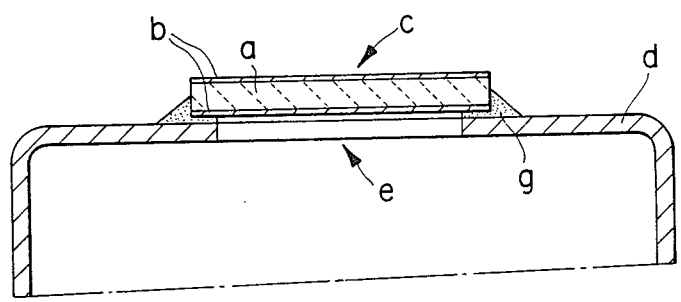
FIGS. 9(A), 9(B) are longitudinal sectional views illustrating steps of a procedure in a conventional method of applying a window member.
Figure 9B:
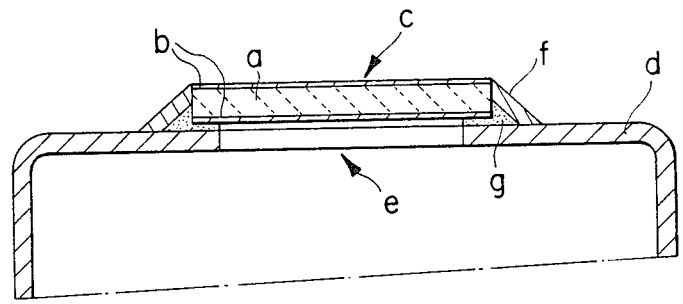

(iii) Finally, as shown in FIG. 6(C), said masking jig 7 surrounding the can is removed from the can 1 and said mask 4 is removed with the electrically conductive thin film 5 formed thereon from the can.

Thus, the window member 2, in which an exposed circumferential side surface of the electrically conductive material layer 2a is connected with the outside end surface of the electrically conductive can 1 surrounding said exposed circumferential side surface by means of the electrically conductive thin film 5 disposed almost uniformly over the entire surface thereof thereby securing a superior shield, can be firmly mounted on the infrared incident opening 1a of the can 1 by the electrically non-conductive adhesives 3.

What is claimed is:

1. A method of fixing a window member to a can of an infrared detector over an incident opening extending through a surface of said can, said can comprising electrically conductive material and having a sensing element body disposed therein, and said window member having first and second opposing end surfaces and a side circumferential surface extending between said first and said second surfaces, said window member having a layer of electrically conductive material between said first and second surfaces forming a portion of said side circumferential surface, said method comprising:

adhering said window member to said surface of said can over said incident opening by providing electrically non-conductive adhesive between said can at a circumferential surface of said can that surrounds said incident opening and said window member at the periphery of said first end surface thereof and on at least part of said portion of said side circumferential surface that is formed by said layer of electrically conductive material thereby leaving at least part of said portion of said side circumferential surface that is formed by said layer of electrically conductive material free from electrically non-conductive adhesive;

covering said second end surface of said window member with a mask;

subsequently applying a continuous electrically conductive thin film on said surface of said can to which said window member is adhered, on said mask covering said second end of said window member and on said part of said portion of said side circumferential surface of said window member that is free from said electrically non-conductive adhesive; and separating said electrically conductive thin film applied on said mask from the remainder of said continuous electrically conductive thin film, and removing said mask with said electrically conductive thin film thereon from said second surface of said window member.

2. A method as claimed in claim 1,
wherein said covering of said second end surface of said window member with a mask is performed prior to the adhering of said window member to said surface of said can.

3. A method as claimed in claim 1,
wherein said covering of said second end surface of said window member with a mask is performed after the adhering of said window member to said surface of said casing.

4. A method as claimed in any one of claims 1, 2 or 3,
wherein said application of said continuous electrically conductive thin film is performed by spattering.

* * * * *